United States Patent
Baset

(10) Patent No.: US 6,703,919 B2
(45) Date of Patent: Mar. 9, 2004

(54) METHOD OF CONFIRMING REMOTE KEYLESS ENTRY LOCK BUTTON STATUS

(75) Inventor: Miah A Baset, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 282 days.

(21) Appl. No.: 09/683,140

(22) Filed: Nov. 27, 2001

(65) Prior Publication Data
US 2003/0098781 A1 May 29, 2003

(51) Int. Cl.[7] .................................................. H04Q 1/00
(52) U.S. Cl. .................. 340/5.72; 340/5.3; 340/825.69; 340/825.72; 340/5.32; 340/5.33; 340/426.15; 340/426.36; 340/457; 307/10.1; 307/10.2
(58) Field of Search ................................. 340/5.72, 5.3, 340/825.69, 825.72, 5.32, 5.33, 457, 438, 426.15, 426.36, 425.5; 307/10.1, 10.2

(56) References Cited

U.S. PATENT DOCUMENTS

| 4,383,242 A | 5/1983 | Sassover et al. |
| 4,884,055 A | 11/1989 | Memmola |
| 4,887,064 A | 12/1989 | Drori et al. |
| 5,568,120 A | 10/1996 | LeMense et al. |
| 6,097,282 A | 8/2000 | Wang |
| 6,259,362 B1 * | 7/2001 | Lin ............................ 340/457 |
| 6,429,773 B1 * | 8/2002 | Schuyler ................. 340/425.5 |

* cited by examiner

Primary Examiner—Michael Horabik
Assistant Examiner—Yves Dalencourt
(74) Attorney, Agent, or Firm—Gregory P. Brown

(57) ABSTRACT

A method of confirming a lock button pressed condition for a remote device associated with a vehicle remote keyless entry system. The method includes setting a counter to zero then, continuously monitoring the remote device for a remote device button activation. If a lock button activation is detected, the counter is increment by one. Otherwise, if an unlock button activation is detected, the counter is reset to zero. An indicator on the remote device is activated, in response to detection of either a lock button or unlock button activation, when the counter is greater than one. In one embodiment, the indicator is an LED which is activated only when, upon detecting a lock button activation, a lock button activation was immediately previously detected. If at any time after initial lock button activation, the unlock button is activated, the LED indicator will not illuminate.

11 Claims, 3 Drawing Sheets

METHOD OF CONFIRMING REMOTE KEYLESS ENTRY LOCK BUTTON STATUS

BACKGROUND OF INVENTION

The present invention relates in general to a remote controller for vehicle anti-theft systems, and more particularly concerns a method of confirming a remote keyless entry lock button status.

Remote entry systems are known for cars, trucks and other transportation vehicles which operate locks, anti-theft systems and vehicle personality features such as seat and mirror positions. A remote entry radio receiver is mounted in the vehicle which responds to a radio transmitter carried by the user of the vehicle. The radio transmitter is often referred to as a remote keyless entry (RKE) device or remote fob wherein "fob" refers to a keychain transmitter. In one common type of system, the user depresses a control button on the RKE transmitter causing a coded signal to be transmitted to the receiver identifying a command desired by the user such as lock or unlock doors, unlock trunk, or arm, disarm or trigger an anti-theft system. Unique portions of the codes identify the individual transmitter to ensure that only an authorized user gains access to the vehicle or the remote entry functions.

In conventional RKE systems, after the pressing the lock button and leaving the vehicle, the user has no way of determining whether the RKE device lock button has been pressed to lock the vehicle. For example, if, after parking the vehicle, the user enters a store and does not recall whether the user locked the vehicle, the user has no way of determining from the RKE device itself whether the last action taken with respect to the RKE device was to lock the vehicle. Thus, the user will often forego double-checking whether the vehicle was locked, or have to return to the vehicle to see whether indeed the vehicle was locked. Accordingly, there exists a need for confirming a RKE device lock button pressed condition regardless of the distance away from the vehicle.

SUMMARY OF INVENTION

In the present invention, the aforementioned problem is solved through the provision of a method of confirming a RKE lock button pressed condition regardless of the distance away from the vehicle. In one embodiment, a method of confirming a lock button pressed condition for a remote device associated with a vehicle remote keyless entry system is provided. The method includes setting a counter to zero then, continuously monitoring the remote device for a remote device button activation. If a lock button activation is detected, the counter is increment by one. Otherwise, if an unlock button activation is detected, the counter is reset to zero. An indicator on the remote device is activated, in response to detection of either a lock button or unlock button activation, when the counter is greater than one. In one embodiment, the indicator is an LED which is activated only when, upon detecting a lock button activation, a lock button activation was immediately previously detected.

One advantage of the present invention is that it provides a method of confirming a RKE lock button pressed status. Another advantage of the present invention is that it eliminates the need to be anywhere near the vehicle to confirm the lock button pressed status. Another advantage of the present invention is that it can be implemented using the standard set of remote key fob buttons. Other advantages and features of the invention will become apparent upon reading the following detailed description and appended claims, and upon reference to the accompanying drawings.

BRIEF DESCRIPTION OF DRAWINGS

For a more complete understanding of this invention, reference should now be made to the embodiments illustrated in greater detail in the accompanying drawings and described below by way of examples of the invention.

In the drawings.

DETAILED DESCRIPTION

While the present invention is described with respect to a method and apparatus of confirming a RKE device lock button pressed status condition for use in an automotive vehicle, the present invention may be adapted to be used in other systems that may require confirmation of a button status at a distance removed from the system controlled by the button under consideration. Thus, the present invention may be used in conjunction with any remote keyless entry system such as a home security system, it is not limited to vehicle anti-theft systems.

In the following detailed description, various operating parameters and components are described for one constructed embodiment. These specific parameters and components are included as examples and are not meant to be limiting.

Figure 1:
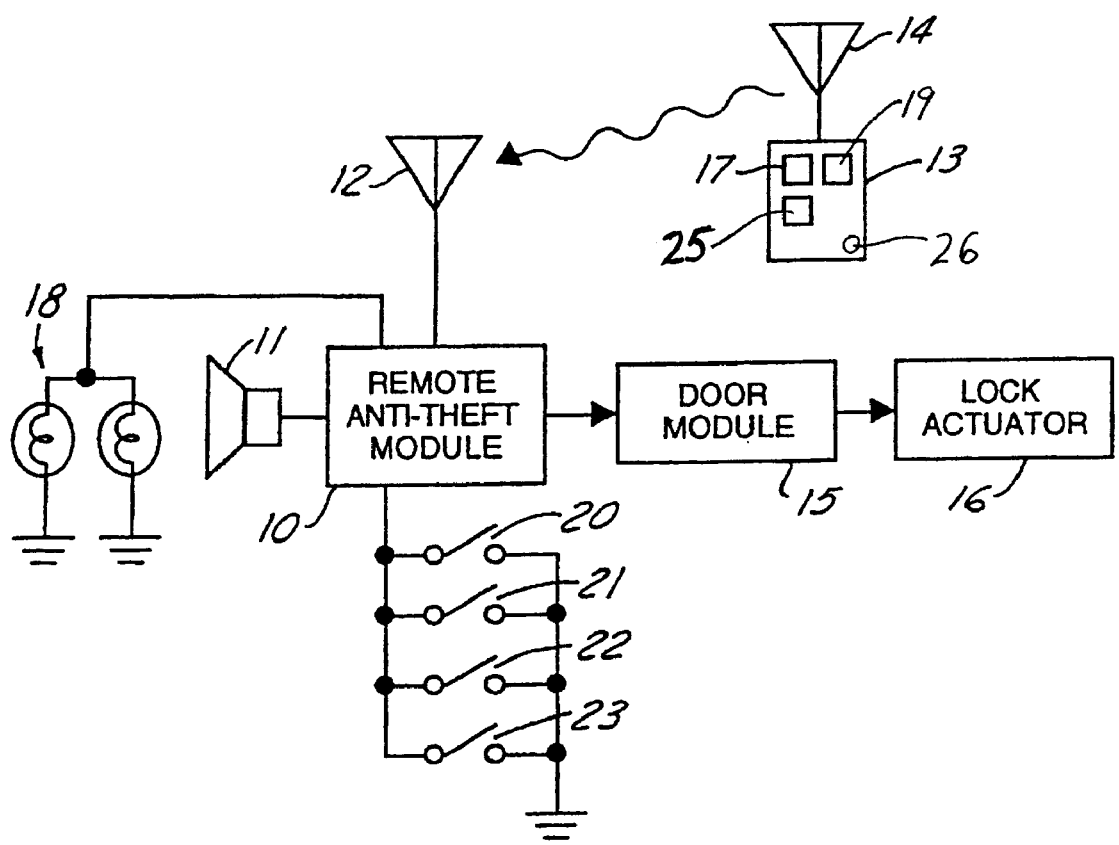
FIG. 1 is a schematic block diagram of a vehicle anti-theft system including a RKE system according to an embodiment of the present invention.

Referring now to FIG. 1, a vehicle mounted remote anti-theft module 10 contains electronics for performing remote entry and anti-theft functions as are well known in the art. A speaker or car horn 11 is connected to module 10 to receive an energizing signal for producing beeps or horn chirps as is known in the art. Likewise, exterior lamps 18 are coupled to module 10 for producing visible flashes under control of module 10. Module 10 is connected to an antenna 12 for communicating with a remote transmitter 13 having its own internal antenna 14. Module 10 is further connected to a door module 15 and provides lock and unlock command signals to door module 15. In turn, door module 15 actually locks or unlocks an appropriate vehicle door via a respective lock actuator 16.

Remote actuator 13 includes a plurality of push buttons including a lock push button 17, an unlock push button 19, and a trunk release button 25. When lock push button 17 is manually activated, a coded signal is sent from the remote transmitter 13 through a radio frequency signal to module 10, which recognizes the coded signal and locks the vehicle door via a lock command signal to door module 115. When unlock push button 19 is manually activated, a coded signal is sent from remote transmitter 13 through a radio frequency signal to module 10 which recognizes the coded signal and unlocks vehicle doors via an unlock command signal to door module 15. Trunk release push button 25 operates in a similar manner.

The type of signal transmitted from remote transmitter 13 preferably includes at least two data segments, namely a user code identifying whether the transmitter is authorized for vehicle entry and a function code, e.g. the lock code, identifying which push button was pressed.

Perimeter protection is provided by a plurality of door position sensors comprised of door switches 20–23, each associated with their respective vehicle door. When a remote transmitter 13 transmits a lock code in response to depressing the lock button 17, remote module 10 locks the vehicle doors and then enters a pre-armed state in which a ready-to-arm indicator light on the vehicle instrument panel is illuminated and the open/closed status of the vehicle doors are checked. Thus, door position sensors 20–23 are checked to determine whether all the doors are closed, and if all the doors are not closed, then module 10 waits in the pre-armed state until they are all closed. Once all of the doors are closed, a predetermined exit delay, e.g. 30 seconds, is begun. The exit delay is necessary since the door lock command may have been initiated from within the vehicle and time may be needed to allow the occupants to leave the vehicle. After the exit delay, the system becomes fully armed and any change in condition of a door position sensor from a door closed signal to a door opened signal results in an alarm.

Besides the lock push button 17, unlock push button 19, and trunk release push button 25 which comprise a standard push button set for a RKE remote transmitter, remote transmitter 13 includes a LED or indicator light 26 which is used according to the method of the present invention described below to indicate the status of the lock button 17 condition. The method of the present invention is implemented in programmable logic circuitry within the remote transmitter 13.

Figure 2:
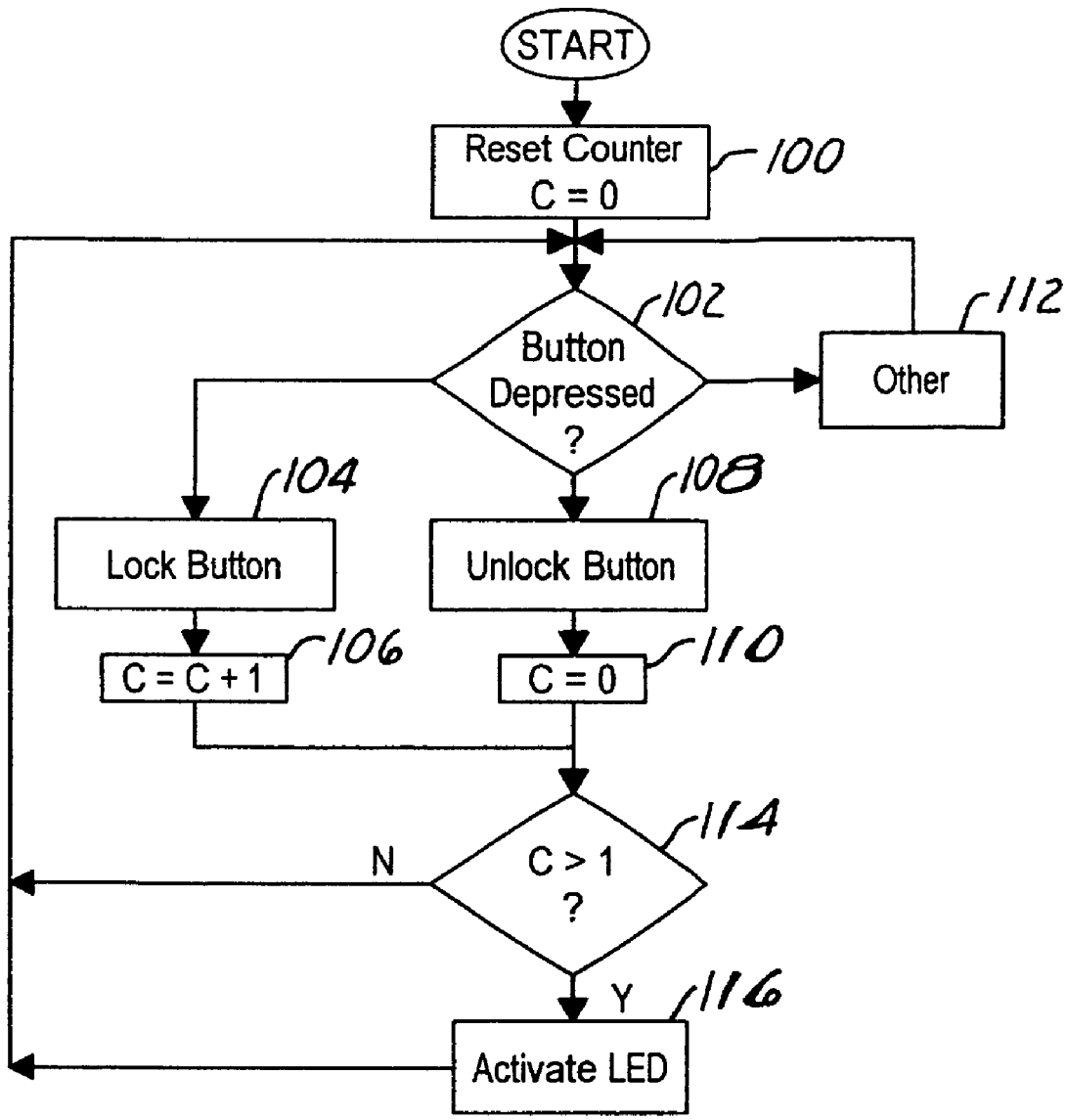
FIG. 2 is a logic flow diagram showing a method of confirming the RKE lock button status according to the present invention.

Referring now to FIG. 2 there is shown a logic flow diagram of one method of confirming the lock button pressed status for the remote transmitter of FIG. 1. The logic routine of FIG. 2 is preferably activated at each engine off cycle. The logic begins in block 100 by resetting a counter within the remote transmitter 13. The counter may be implemented as a software flag within the remote transmitter logic. After resetting the counter, the logic continues to block 102 to detect whether any button on the remote transmitter has been pressed.

If the lock button 17 of the remote transmitter 13 has been pressed, the logic continues to block 104 and increments the counter in block 106. If the unlock button has been depressed, the logic continues to block 108 and resets the counter in block 110. Otherwise, if any other button on the remote transmitter 13 is depressed, the logic continues to block 112 and continues to wait until another button is depressed.

If neither the lock button 17 nor unlock button 19 are depressed, the logic continues as shown to block 114 wherein the counter is checked to determine whether it is greater than 1. If the counter is incremented to be greater than 1, the LED 26 is activated in block 116 and the logic then continues to await for the next button depression. Otherwise, the LED is not activated and the logic loops back to block 102 to await the next button activation on the remote transmitter 13.

In operation, after engine off and activation of the lock button 17, the counter will be equal to 1 and the LED will not be activated upon the first activation of the lock button 17. If, at a later time, the lock button 17 is pressed again, the counter will be incremented to be greater than 1 and the LED will be activated upon each lock button activation. If, however, the unlock button 19 is pressed at any time after the first lock button activation, the counter will be reset and the next activation of the lock button 17 will not result in activation of the LED.

Following are several examples of the operation of the logic routine of FIG. 2. In the first example, the lock button 17 is pressed and the LED 26 does not blink and is not otherwise activated. Two possible conclusions can be drawn. First, the vehicle was just locked, or second, the unlock button 19 had been pressed prior to the lock button being pressed. In another example, the lock button is pressed and the LED blinks once. According to the logic routine of FIG. 2, it must be concluded that the lock button was previously pressed.

One advantage of the logic of FIG. 2 is that no additional hardware is required in either the receiver module or the remote transmitter other than the LED which, in some remote transmitters, is already present. The logic can be implemented through software resident in the remote transmitter.

Figure 3:
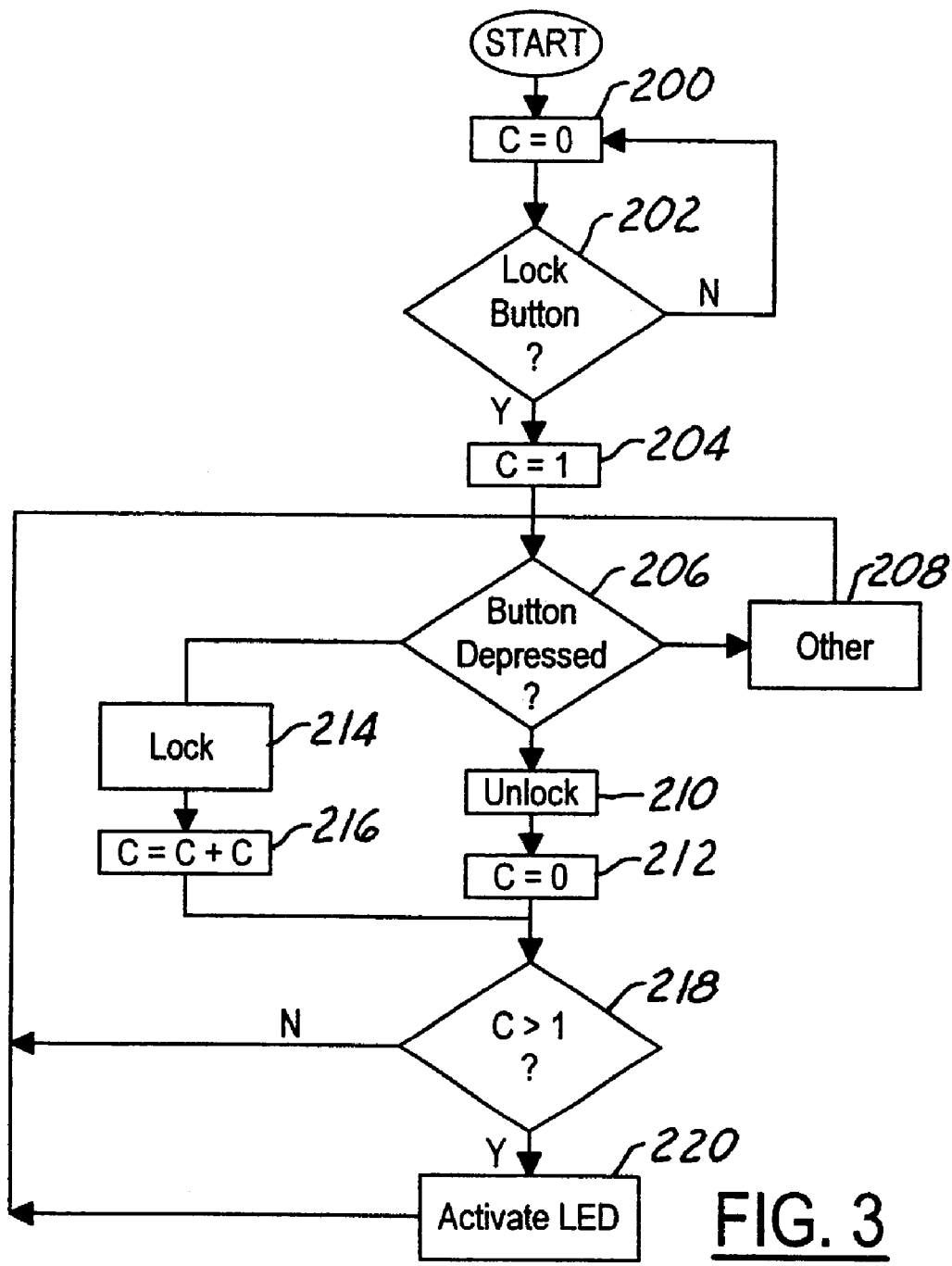
FIG. 3 is a logic flow diagram showing a method of confirming the RKE lock button status according to another embodiment of the present invention.

Referring now to FIG. 3 there is shown a logic flow diagram of another method of confirming the lock button pressed status in accordance with the present invention. The logic begins again in block 200 by resetting the counter upon preferably, an engine off signal. The logic then stays in a continuous loop between blocks 202 and 200 awaiting the first activation of the remote transmitter lock button. Upon first activation of the lock button in block 202, the counter is set equal to 1 in block 204.

Once the counter or flag is set in block 204, the logic continues to monitor any button activation in block 206. If any button other than the lock or unlock button is depressed, the counter status is not changed as shown in block 208. If the unlock button is depressed in block 210, the counter or flag is reset in block 212. If the lock button is depressed in block 214, the counter set equal to the previous counter value incremented by the previous counter value in block 216. Thus, if the lock button is depressed in block 202 and then again depressed as detected in block 214, the counter will be set equal to 2. If, however, an unlock button depression is detected in block 210, the counter will be set to zero and remain at zero even upon a subsequent detection of a lock button depression in block 214.

The status of the counter is monitored in block 218 and, if greater than 1, the LED is activated by being blinked in block 220. The logic routine then returns to block 206 to await the next remote transmitter button activation.

In operation, the logic of FIG. 3 will activate the LED on the remote transmitter as long as a continuous sequence of lock button activations are present. The LED will also be activated even if the lock button sequence is interrupted by another button depression other than the unlock button. If, however, the unlock button is activated at any time after the first lock button depression, the LED will not activate until the logic is reset.

From the foregoing, it can be seen that there has been brought to the art a new and improved method of conforming a RKE lock button status. While the invention has been described in connection with one or more embodiments, it will be understood that the invention is not limited to those embodiments. For example, although remote transmitter 13 and module 10 have been described as radio frequency transmitter and receiver, respectively, both could also be implemented as infrared transmitter and receiver. Other forms of wireless communication are also contemplated by the present invention. Thus, in this regard, the invention covers all alternatives, modifications and equivalents as may be included within the spirit and scope of the appended claims.

What is claimed:

1. A method of confirming a lock button pressed condition for a remote device associated with a vehicle remote keyless entry system comprising:

setting a counter to zero, then;

continuously detecting a remote device button activation, and if a lock button activation is detected, incrementing said counter by one, otherwise if an unlock button activation is detected, resetting said counter to zero; and activating an indicator on said remote device, in response to said remote device button activation, when said counter is greater than one.

2. A method according to claim 1 wherein setting occurs in response to an engine off signal from said vehicle.

3. A method according to claim 1 wherein setting occurs in response to an ignition off signal from said vehicle.

4. A method according to claim 1 wherein activating includes activating an LED on said remote device for a predetermined period of time.

5. A method according to claim 1 wherein activating includes blinking an LED on said remote device.

6. A method of confirming a lock button pressed condition for a remote device associated with a vehicle remote keyless entry system comprising:

setting a counter to zero, then;

in response to detecting a lock button first activation, setting said counter equal to one, then;

continuously detecting a remote device button activation, and if a lock button second activation is detected, setting said counter equal to a stored counter value plus said stored counter value, otherwise if an unlock button activation is detected, storing said counter value as zero; and activating an indicator on said remote device, in response to said remote device button activation, when said counter is greater than one.

7. A method according to claim 6 wherein setting occurs in response to an engine off signal from said vehicle.

8. A method according to claim 6 wherein setting occurs in response to an ignition off signal from said vehicle.

9. A method according to claim 6 wherein activating includes activating an LED on said remote device for a predetermined period of time.

10. A method according to claim 6 wherein activating includes blinking an LED on said remote device.

11. A remote device for a vehicle remote keyless entry system comprising:

an indicator element;

a lock button;

an unlock button; and logic control circuitry including a counter, said circuitry programmed to set said counter to zero then, continuously detect a lock or unlock button activation and, if a lock button activation is detected, increment said counter by one, otherwise if an unlock button activation is detected, reset said counter to zero, said logic control circuitry further programmed to activate said indicator element, in response to said remote device button activation, when said counter is greater than one.

* * * * *